United States Patent [19]

Davenport et al.

[11] Patent Number: 5,398,171

[45] Date of Patent: Mar. 14, 1995

[54] LIGHT GUIDE TERMINATION ARRANGEMENT FOR PRODUCING A CONVERGENT BEAM OUTPUT

[75] Inventors: John M. Davenport, Lyndhurst; Richard L. Hansler, Pepper Pike, both of Ohio

[73] Assignee: General Electric Company, Schenectady, N.Y.

[21] Appl. No.: 116,184

[22] Filed: Sep. 2, 1993

[51] Int. Cl.$^6$ .............................................. F21V 8/00
[52] U.S. Cl. ...................... 362/32; 362/263; 362/328; 362/335
[58] Field of Search ............... 362/19, 32, 61, 263, 362/328, 335, 303

[56] References Cited

U.S. PATENT DOCUMENTS

| | | | |
|---|---|---|---|
| 2,143,673 | 1/1939 | Baumgartner | 362/303 |
| 4,281,366 | 7/1981 | Warster et al. | 362/32 |
| 4,811,172 | 3/1989 | Davenport et al. | 362/80 |
| 4,958,263 | 9/1990 | Davenport et al. | 362/263 |

OTHER PUBLICATIONS

"High Collection Nonimaging Optics", Welford et al, pp. 205-209, 1989.
"The Optics of Nonimaging Concentrations and Solar Energy", Welford et al pp. 53-76, 1978.
"Fundamentals of Optics", Jenkins et al, pp. 523-526, 1976.

*Primary Examiner*—Ira S. Lazarus
*Assistant Examiner*—Sara Sachie Raab
*Attorney, Agent, or Firm*—George E. Hawranko; Stanley C. Corwin

[57] ABSTRACT

An illumination system is disclosed which serves to reduce the divergence of a light beam exiting a small diameter optical fiber from what it was upon entering the optical fiber and is particularly suited for automotive forward lighting applications. The illumination system comprises a spherical reflector, a light source, an optical fiber, a hemispherical lens, and an air gap between the planar surface of the hemispherical lens and the output face of the optical fiber. The spherical reflector allows a light beam from the light source to be introduced into the input face of the optical fiber over a wide angle in order to minimize the diameter of the optical fiber. An air gap exists between the planar surface of the hemispherical lens and the output face of the optical fiber that together with the lens are effective in reducing the angular divergence of the beam from what it was upon entering the input face of the optical fiber. The smaller diameter fiber has the advantages of a lighter weight, less cost, greater design flexibility, and ease of manipulation compared to a thicker fiber.

9 Claims, 4 Drawing Sheets

LIGHT GUIDE TERMINATION ARRANGEMENT FOR PRODUCING A CONVERGENT BEAM OUTPUT

CROSS-REFERENCE TO A RELATED APPLICATION

The present application is related to U.S. patent application Ser. No. (to be assigned) entitled "An Improved Optical Coupling Arrangement Between a Lamp and a Light Guide" (Attorney Docket LD 10,304) filed evendate herewith, assigned to the same assignee as the present invention and herein incorporated by reference.

FIELD OF THE INVENTION

The present invention relates to an illumination system for reducing the angular divergence of a beam of light emerging from an optical fiber from what it was entering the fiber. More particularly, the present invention relates to an illumination system which utilizes a lens for reducing the angular divergence of a beam of light emerging from a minimum diameter optical fiber into a narrow controlled beam of light and which is particularly suited for automotive applications.

BACKGROUND OF THE INVENTION

The concept of collecting light from a central lighting source, introducing it into a light guide such as an optical fiber, and channeling it through the guide to a remote location has been proposed for various applications such as automotive, display lighting, and home lighting. U.S. Pat. No. 4,958,263 issued to Davenport et al. on Sep. 18, 1990, which is assigned to the same assignee as the present invention describes the use of this concept in a central lighting system for automotive applications. The goal of this automotive central lighting system as well as any other central lighting system is to achieve the most efficient light output at the point of delivery and deliver such light output in a manner that allows for the specific lighting design considerations. For instance, future designs in forward lighting systems for automobiles are tending towards sleek, narrow head lamp designs for both improved aerodynamic performance of the vehicle and aesthetic appeal. These designs require a small narrow beam of light to provide the necessary illumination. In order to provide a narrow beam, as is required for this specific application as well as others, small diameter fibers on the order of 6 to 8 mm are used for delivering the light. An elliptical reflector is typically used for collecting light from the light source and focusing it onto the entrance face of the optical fiber. In known systems, the light source is placed at the first focal point of the ellipse closer to the elliptical reflector surface. The elliptical reflector forms an image of the light source at its second focal point, wherein both the first and second foci are located on the axis of the reflector. The image is magnified by a factor of four to five times. It is also known that the input end of the optical fiber is disposed at the point of formation of the magnified image so that the beam of light enters the input face of the optical fiber at a full angle of 60 degrees, which in turn necessitates that the light exit the output end of the fiber at the same full angle of 60 degrees. In this manner a narrow beam of light suitable for use in automotive applications is produced. The four to five fold magnification of the image, however, imposes a limitation on the minimum diameter fiber that can be used, since a somewhat larger diameter fiber must be used in order to collect all the light from the magnified image. In other words, the diameter of the optical guide must be on the order of four to five times the size of the light source to collect substantially all the light from the image.

It would be advantageous to use the smallest possible diameter fiber since a smaller diameter fiber would provide the benefits of cost, size, weight, and design flexibility, in addition to providing a more controlled beam pattern. In addition, a smaller diameter fiber has a higher lumen density, measured as the lumens per unit cross sectional area of the optical fiber. In order to provide a most efficient light delivery system substantially all the light from the image must be introduced into the input face of the fiber. To achieve such an efficient light delivery system using a smaller diameter fiber would require that the magnification of the image formed by the reflector be reduced, preferably to unit magnification. In this case an optical fiber of the same order of magnitude as the light source can be used to collect the light from the light source in an efficient manner. It is known in the prior art that unit magnification of the light source can be achieved by using a spherical reflector in place of an elliptical one. In fact, U.S. Pat. No. 4,956,759 describes an illumination system that employs a spherical reflector to form a unit magnification image. In such a system the light source is positioned near the center of curvature of the reflector and an image of unit magnification is formed at a point near the source. In order to collect the maximum amount of light from the light source the input face of the optical fiber would have to be placed at the point of formation of the unit magnification image disposed near the center of curvature of the reflector. With this arrangement the light entering the input face of the optical fiber from the reflector would do so over a solid angle of up to 180 degrees. The fact that the beam of light emerges from the output end of the fiber at the same angle of up to 180 degrees that it entered the fiber presents the problem that the beam is too wide for most applications that require a narrow controlled beam of light. This invention provides a method for reducing the angular divergence of a beam of light exiting such optical fiber from what it was entering the fiber so that the light output is useable for automotive and other applications that require a narrow beam of light.

Non-imaging optical couplers may be used to reduce the angular divergence of the beam into a narrow controlled beam. Such couplers have been described to a great extent by R. Winston and W. T. Welford in *The Optics of Nonimaging Concentrators and Solar Energy*. Academic Press, 1978. Additionally, previously referenced U.S. Pat. No. 4,956,759 provides an illumination system with two spherical reflectors for coupling light from a light source to form an image and a non-imaging coupler to focus the light from the image into a controlled beam. While the non-imaging coupler can perform this task, it does so using reflection at the surface of the non-imaging coupler. The non-imaging coupler is unsuited for this application because of the bulky nature of the non-imaging reflector. A bulky system would be particularly disadvantageous in applications that require reduced size and weight as well as design flexibility and ease of manipulation of the light source.

It is the objective of this invention to provide a lens for reducing the angular divergence of a beam of light emerging from an optical fiber of minimum diameter into a narrow controlled beam and to achieve the narrow beam in an efficient illumination system that lends itself to reduced size, weight, and cost and in which the light beam can easily be manipulated in a precise manner.

SUMMARY OF THE INVENTION

The present invention provides a lens for reducing the angular divergence of a beam of light exiting the end of an optical fiber from what it was entering the optical fiber. A beam of light introduced into an optical fiber at a wide angle, to minimize the diameter of the optical fiber, will necessarily exit the optical fiber at the same wide angle it entered. In the present invention a lens is provided for reducing the angular divergence of a light beam exiting an optical fiber of minimum diameter to an extent such that the beam is useable for most applications that require a small narrow beam of light. This invention is particularly suited for automotive applications where a more focused beam is desirable. It is also suited for light painting where the flexibility of the minimum diameter fiber provides for precise control of the light source.

One embodiment of the present invention comprises a reflector with unit magnification, a light source, a minimum diameter optical fiber, and a hemispherical lens. The reflector, having a predetermined center of curvature, is hemispherical. The light source is positioned within the reflector so as to be approximately disposed near the center of curvature of the reflector. The light input end of the optical fiber is positioned within the reflector so as to be approximately disposed near the center of curvature of the reflector and be at the same distance from the center of curvature of the reflector as the light source and in the same plane with it. A thick hemispherical plano-convex lens is placed at the output end of the optical fiber with the planar surface close to, but not in optical contact with the output end of the optical fiber. The lens is positioned in such a manner that its axis is coincident with that of the output end of the fiber but an air gap exists between the planar surface of the lens and the output end of the fiber. The radius of curvature of the lens is approximately equal to the diameter of the optical fiber and the diameter of the planar surface of the lens is thus double that of the fiber. The thickness of the lens is about equal to the radius of curvature or slightly greater. The gap between the planar surface of the lens and the output end of the fiber serves to allow the light exiting the output end of the fiber to diverge prior to being converged as it enters the planar surface of the lens. The divergent light output from the optical fiber is thus converged a first time at the interface between the air gap and planar surface of the lens and a second time at the curved surface of the lens.

BRIEF DESCRIPTIONS OF THE DRAWINGS

In the following detailed description of the invention, reference will be made to the attached drawings in which.

DETAILED DESCRIPTION OF THE INVENTION

Figure 1:
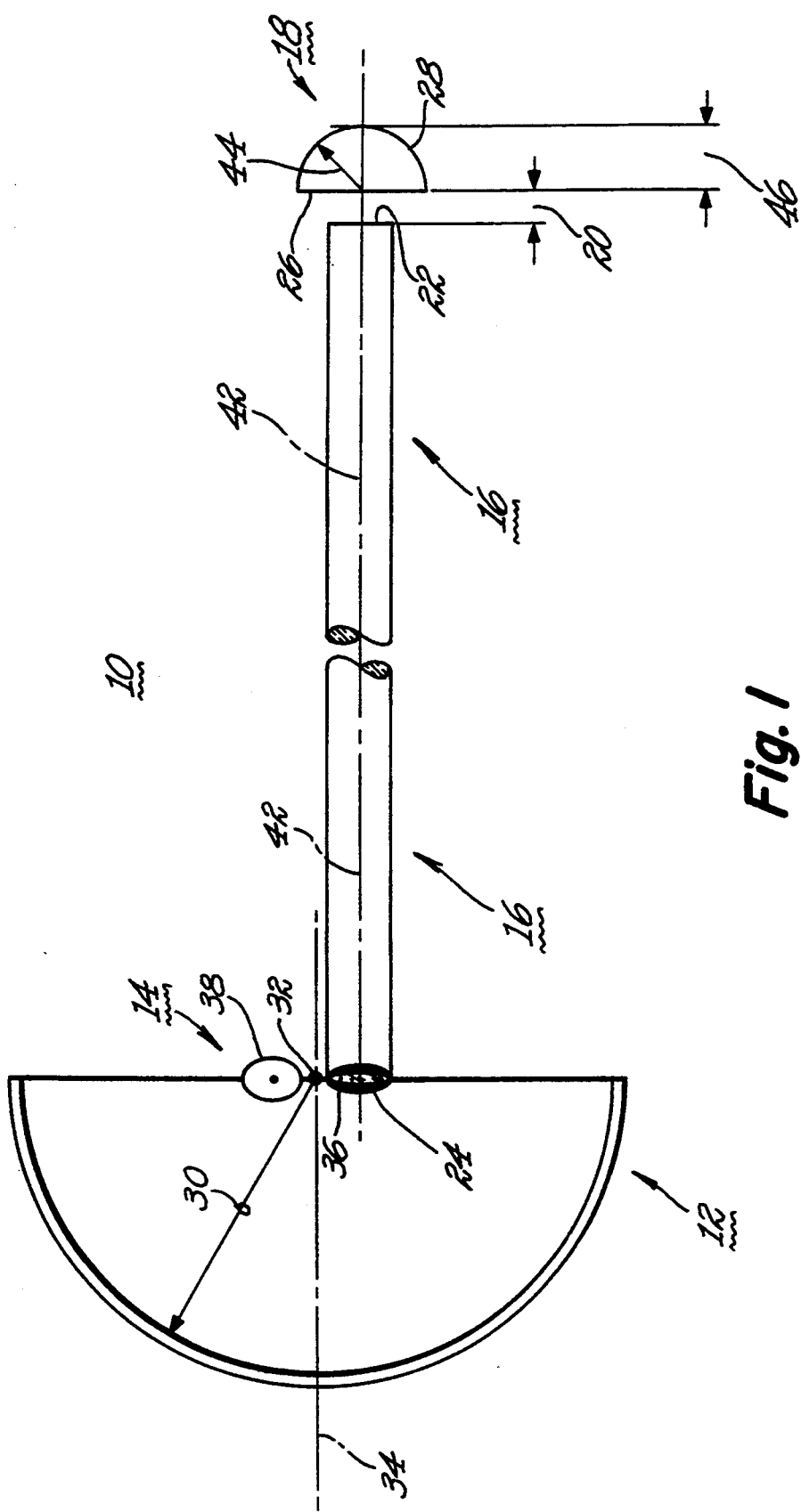
FIG. 1 is an elevational view in section of an embodiment of the present invention showing the hemispherical reflector, the optical fiber, the hemispherical lens, and the air gap between the lens and the optical fiber.

FIG. 1 is a side view in section showing one embodiment of the present invention 10 comprising a reflector 12 which is spherical, a light source 14, an optical fiber 16, a hemispherical lens 18 and an air gap 20 between the output end 22 of the optical fiber 16 and the planar surface 26 of the lens 18. Although shown as only one optical fiber 16, one skilled in the art would know that the present invention could be beneficially practiced by use of a number of optical fibers combined in a manner to achieve substantially the same cross-sectional dimension as provided by optical fiber 16; it is contemplated that such a modification would be within the scope of the present invention. The spherical reflector 12 couples the light from the light source 14 into the input end 24 of the optical fiber 16, where it is channelled to the output end 22 of the optical fiber 16. The hemispherical lens 18 serves to reduce the divergence of the beam of light as it exits the output end 22 of the optical fiber 16 through the air gap 20. The air gap 20 is critical to the ability of the given embodiment of the present invention to reduce the divergence of the output beam to a narrow controlled beam of light. Specifically, the air gap 20 allows the beam exiting the output end 22 of the optical fiber 16 to diverge prior to impinging upon the planar surface 26 of the lens 18. The divergent beam exiting the output end 22 of the optical fiber 16 is converged a first time at the interface between the air gap 20 and the planar surface 26 and a second time at the curved surface 28 of the lens 18. Since the successive convergence of the light beam at the two interfaces is cumulative, the divergence of the beam is reduced to a much greater extent since the air gap is present.

The spherical reflector 12 has a predetermined radius of curvature 30. The light source 14 is positioned so as to be disposed near the center of curvature 32 of the reflector 12 yet off its axis 34 but in the same vertical plane as the center of curvature 32. The reflector 12 collects the light from the source 14 that is incident upon its surface to form an image 36 of the light source 14, of unit magnification, at a distance from the light source 14 that is twice that of the light source 14 from the center of curvature 32 of the reflector 12. The image 36 is coplanar with the light source 14 and the center of curvature 32 of the reflector 12. The reflector 12 is spherical so as to provide an image 36 of unit magnification which allows for the use of a minimum diameter fiber, since the diameter of the optical fiber 16 need be no larger than the light source 14 in order to collect substantially all the light from the image 36. This means the image 36 is the same size as the light source 14. The diameter of the optical fiber is small, on the order of 6 mm or less compared to about 10 mm for optical fibers used with existing couplers that employ elliptical reflectors with magnification greater than one. With a magnification greater than one the light guide must be fairly large in order to collect substantially all the light from the light source. Unit magnification of the image is essential to minimize the diameter of the optical fiber needed in order to avoid the more expensive, heavier, and unwieldy larger diameter fibers. Assuming that the same amount of light from a light source reaches the input face of the optical fiber in each case, a smaller diameter fiber has a higher lumen density and is therefore more efficient. Lumen density is defined as the lumens per unit cross sectional area of the optical fiber.

In one embodiment of the present invention the reflector 12 is ellipsoidal yet approximately hemispherical so as to provide an image of near unity magnification. In this reflector, the foci where the light source 14 and the image 36 are located are close together, a distance approximately equal to the distance between the arc gap. Such an ellipsoidal reflector gives a slightly improved image with slightly less loss of light compared to a spherical reflector.

FIG. 1 of the preferred embodiment of the present invention shows a light source 14 which can be a high pressure xenon metal halide discharge lamp such as is described in U.S. Pat. No. 5,059,865. This light source is preferred since all the light coming from this discharge source comes from the core of the arc, in which case the diameter of the optical fiber 16 need be no larger than the core of the arc gap, and should approximately be the same size, in order to collect substantially all the light from the image 36. Approximately 50 percent of the light from the source 14 reaches the reflector 12 since the light source 14 is located near the center of curvature 32 of the reflector 12 with one half of its surface facing away from the reflector 12. The light source 14 may be coated with a reflective coating on the side 38 of the light source 14 facing away from the reflector 12 to redirect the light emitted away from the reflector 12 back towards the reflector 12, thus increasing the amount of light reaching the reflector 12 from 50 percent to about 75 percent. In comparison elliptical reflectors typically capture about 65 percent of the light from the source. Although it is preferred to use a discharge lamp as the light source 14, in another embodiment of the present invention, a small incandescent filament inside a small bulb could be used as the light source. For example a low voltage Halogen IR (TM) lamp is well suited. In this embodiment it may be desirable to make the filament slightly shorter and fatter than normal, so the image will fit at the input end 24 of the optical fiber 16.

Figure 2:
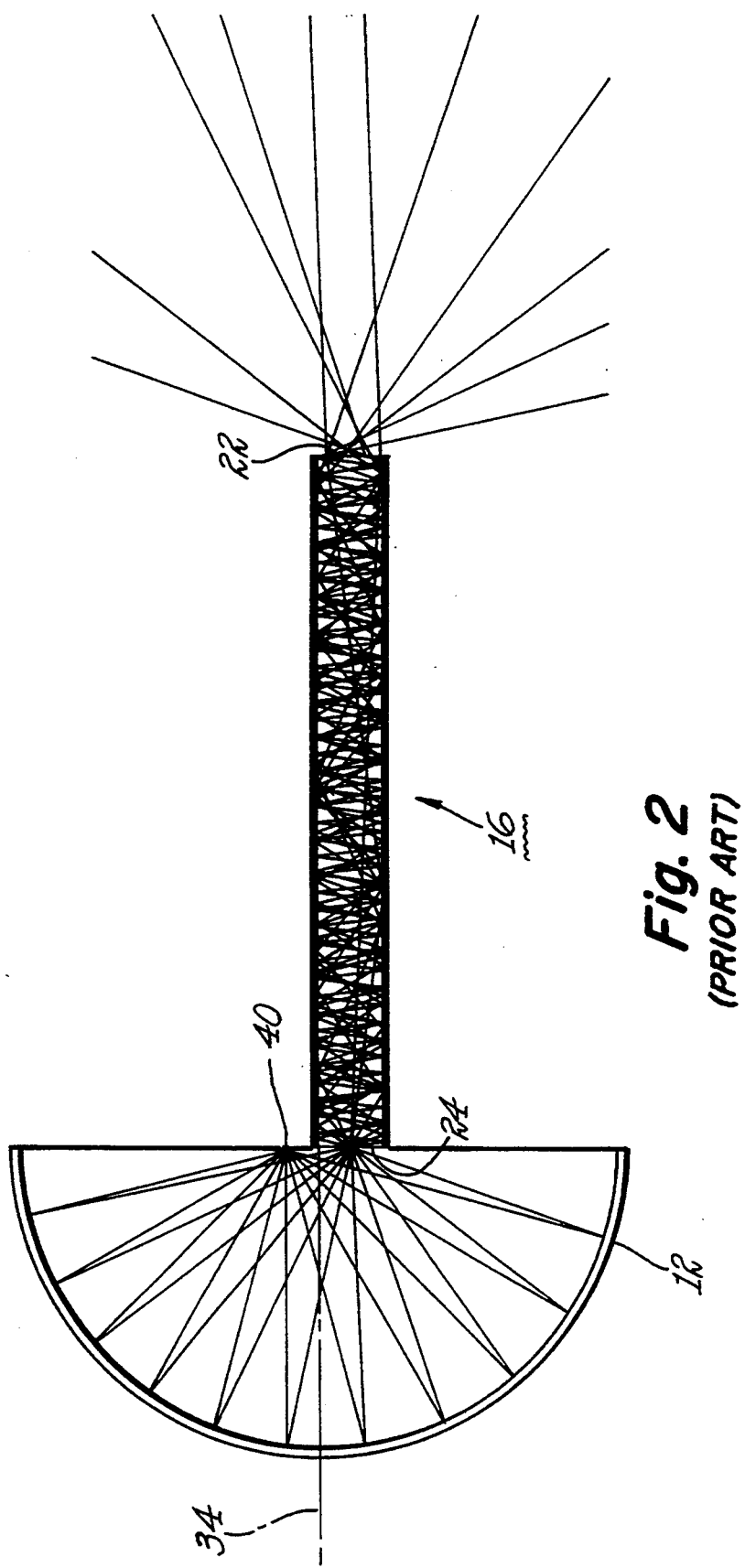
FIG. 2 is a ray trace illustrating a hemispherical reflector introducing light into an optical fiber over a wide solid angle and the emergent beam diverging from the optical fiber at the same solid angle it entered, according to prior art techniques.
Figure 3:
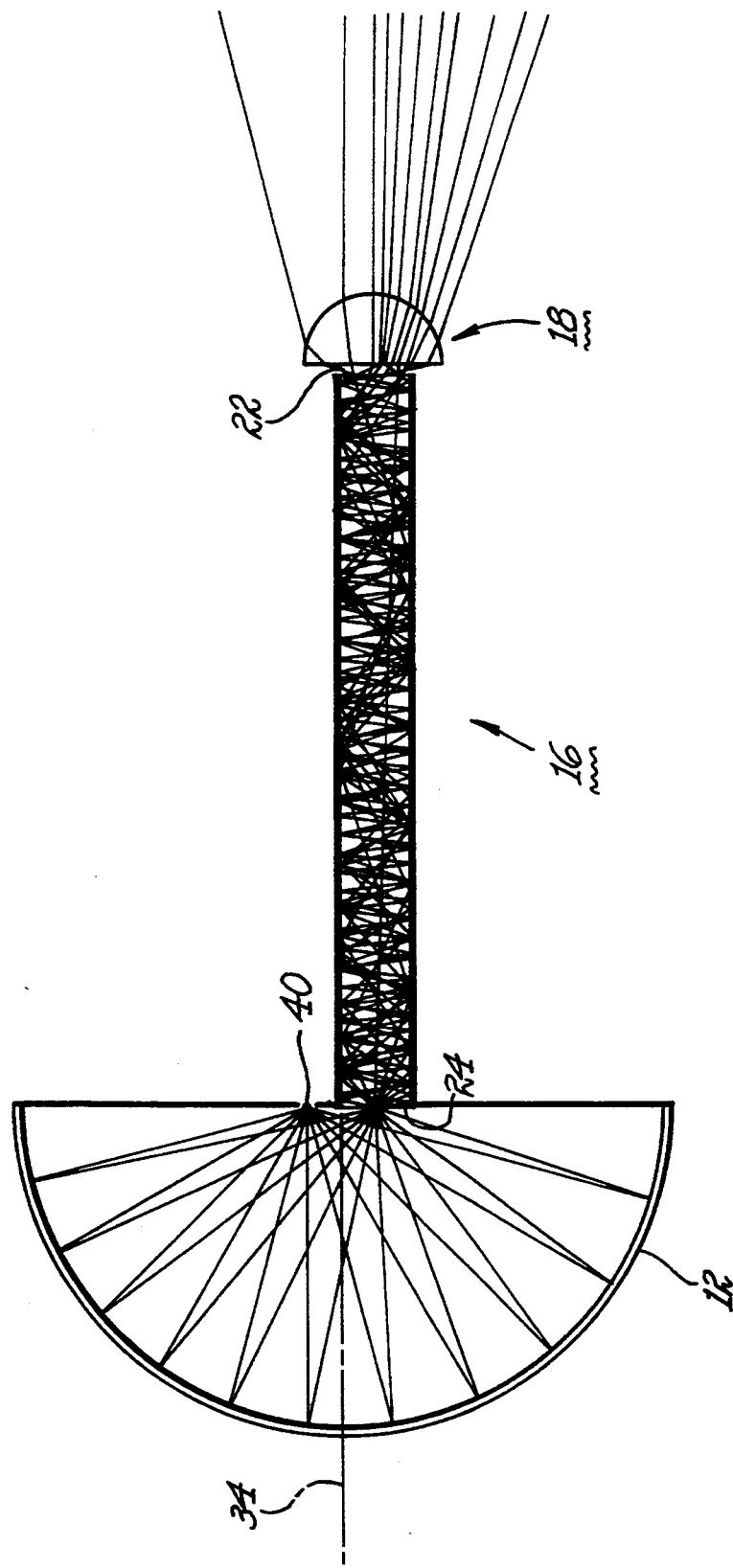
FIG. 3 is a ray trace showing how the angular divergence of light introduced into the optical fiber at a 180 degree full angle is reduced to a 70 degree full angle using a perfectly hemispherical lens placed at the end of the optical fiber, in accordance with the present invention.

The input end 24 of the optical fiber 16 is positioned at the point of formation of the image 36. The beam of light from the surface of the reflector 12 forms the image 36 at the entrance to the input end 24 of the optical fiber 16 in such a manner that the beam enters the input end of the optical fiber over a wide angle up to 180 degrees. According to techniques practiced in the prior art, the light introduced at the input end 24 of the optical fiber 16 over a wide angle up to 180 degrees will emerge from the output end 22 of the optical fiber 16 over the same wide angle up to 180 degrees as illustrated in FIG. 2. FIG. 2 is a ray trace illustrating how a light beam introduced at a wide angle up to 180 degrees into a minimum diameter optical fiber exits the optical fiber at the same wide angle it entered. Despite the high lumen density achieved this way, the divergent output beam is too wide for most applications that require a narrow controlled beam of light, for example in automobile headlamps. FIG. 3 is a ray trace illustrating how a lens 18 placed next to but not in optical contact with the output end 22 of the optical fiber 16 reduces the angular divergence of a beam of light exiting the output end 22 of the optical fiber 16. The beam divergence is reduced to about 70 degrees full angle. The ray traces of FIG. 2 and FIG. 3 are results of an optical modelling program such as Opticad (TM) available from Opticomp Corporation for a point source 40 that is located 1.2 mm off the axis 34 of the reflector 12. Rays at the full two pi solid angle are not shown because of the nature of the ray trace program used to produce the results.

The above-mentioned behavior of light as it enters and leaves the optical fiber is fundamental and follows the invariance principle in light optics where an inverse relationship exists between the solid angle formed by a beam of light and the area through which the beam passes. As an illustration of this principle, if the area through which a beam of light exits the optical fiber is increased from what it was entering the fiber, then the angular divergence of the beam will decrease from what it was when entering the fiber. We shall refer to this fundamental behavior of light as the principle of trading angle for area hereinafter.

The optical fiber 16 of the embodiment of the present invention shown in FIG. 1 is of a polymeric material but may also be of other material capable of transmitting light by total internal reflection such as quartz. The optical fiber has a refractive index with a value of 1.46 corresponding to a critical angle of forty two degrees with an air interface. All light entering into the input face of the optical fiber at an angle within 180 degrees (or 90 degrees with respect to the fiber axis 42) will travel through the optical fiber at an angle to the normal of the fiber axis 42 no less than the complement of the critical angle, that is forty eight degrees. In other words, total internal reflection occurs if the ray of light entering the optical fiber 16 makes an angle with the fiber axis 42, inside the fiber, no greater than the critical angle, forty two degrees. The light can only travel inside the fiber at an angle less than forty eight degrees if its direction is altered by scattering or bending of the fiber, since the light can only enter and leave the ends of the fiber if it is travelling at less than forty eight degrees inside the fiber. This effect, known to prior art, is shown in the ray trace of FIG. 2 in which light introduced over a two pi solid angle leaves the guide at the same angle it entered the fiber, after travelling through the fiber.

In the preferred embodiment 10 of the present invention of FIG. 1 a hemispherical lens 18 is placed next to but not in optical contact with the output end 22 of the optical fiber 16. Both the curved surface 28 of the lens 18 and the air gap 20 between the output end 22 of the optical fiber 16 and the planar surface 26 of the lens 18 play critical roles in reducing the angular divergence of the beam exiting the output end 22 of the optical fiber 16. The lens 18 has a radius of curvature 44 and thickness 46 both substantially equal to the diameter of the optical fiber 16. The diameter of the planar surface of the lens is about twice the diameter of the optical fiber. The beam from the output end 22 of the optical fiber 16 diverges through the air gap 20 and is converged towards the axis of the lens 18 at the planar surface 16 of the lens in accordance with the laws of refraction in light optics. Upon exiting the lens 18 the beam is refracted a second time towards the axis of the lens 18 further reducing the divergence of the beam. The extent to which the beam is converged depends on the refractive index of the lens. A higher refractive index material for the lens will converge the beam to a greater extent but for practical reasons the refractive index of the lens should be close to that of the fiber. As a result, if the air gap 20 is eliminated by placing the planar surface 26 of the lens 18 in optical contact with the output end 22 of the fiber 16, the beam converges only at the curved surface 28 of the lens 18. In addition no refraction would occur at the interface between the output end 22 of the optical fiber 16 and the planar surface 26 of the lens due to the similar refractive indices of the lens and the fiber. In this case the convergence of the beam would occur only by virtue of the curvature 28 of the lens 18 in accordance with the principle of trading angle for area. The air gap 20 serves to further reduce the divergence of the beam in addition to the curvature of the lens 18. This effect is shown in FIG. 3 in which the ray trace illustrates the beam of light emerging from the lens 18 at a reduced angular divergence of about 50 degrees full angle compared to the wide angle up to 180 degrees when it entered the optical fiber 16.

If the refractive index of an unclad optical fiber is greater than the square root of two, that is 1.4142 (which corresponds to a critical angle of 45 degrees), light coming into the fiber at 90 degrees or less to the fiber axis will be transmitted through the fiber by total internal reflection. The fiber can be clad with a thin sheath of material having a lower refractive index than that of the core, in which case the angle to the axis for which the light will be transmitted will be reduced. This type of optical fiber may be acceptable since the light which encounters the end of the optical fiber of the guide at an angle to its axis greater than about 75 degrees is strongly reflected so that the amount of light entering at such large angles may not be significant. This phenomenon whereby light entering the fiber at large angles is lost is well known in optics. As described by Jenkins, F. A. and White H. E. in *Fundamentals of Optics,* p. 525, McGraw Hill, 1976, these Fresnel losses amount to 4 percent for light at normal incidence and increase dramatically at angles greater than about 75 degrees for a refractive index of 1.5 and are due to the differences in refractive indices between air and the fiber. The light thus leaves at a small angle. The light leaving the lens will therefore exit the lens at about fifty degrees full angle or less. Anti-reflection coatings could be applied to the input and output ends of the optical fiber to reduce the Fresnel losses. The extent to which the angular divergence is reduced depends on the refractive index of the lens as well as its curvature. A material with a higher refractive index than that of glass (1.5) which we have considered thus far, will tend to bend light more and hence reduce the angular divergence the most.

Figure 4:
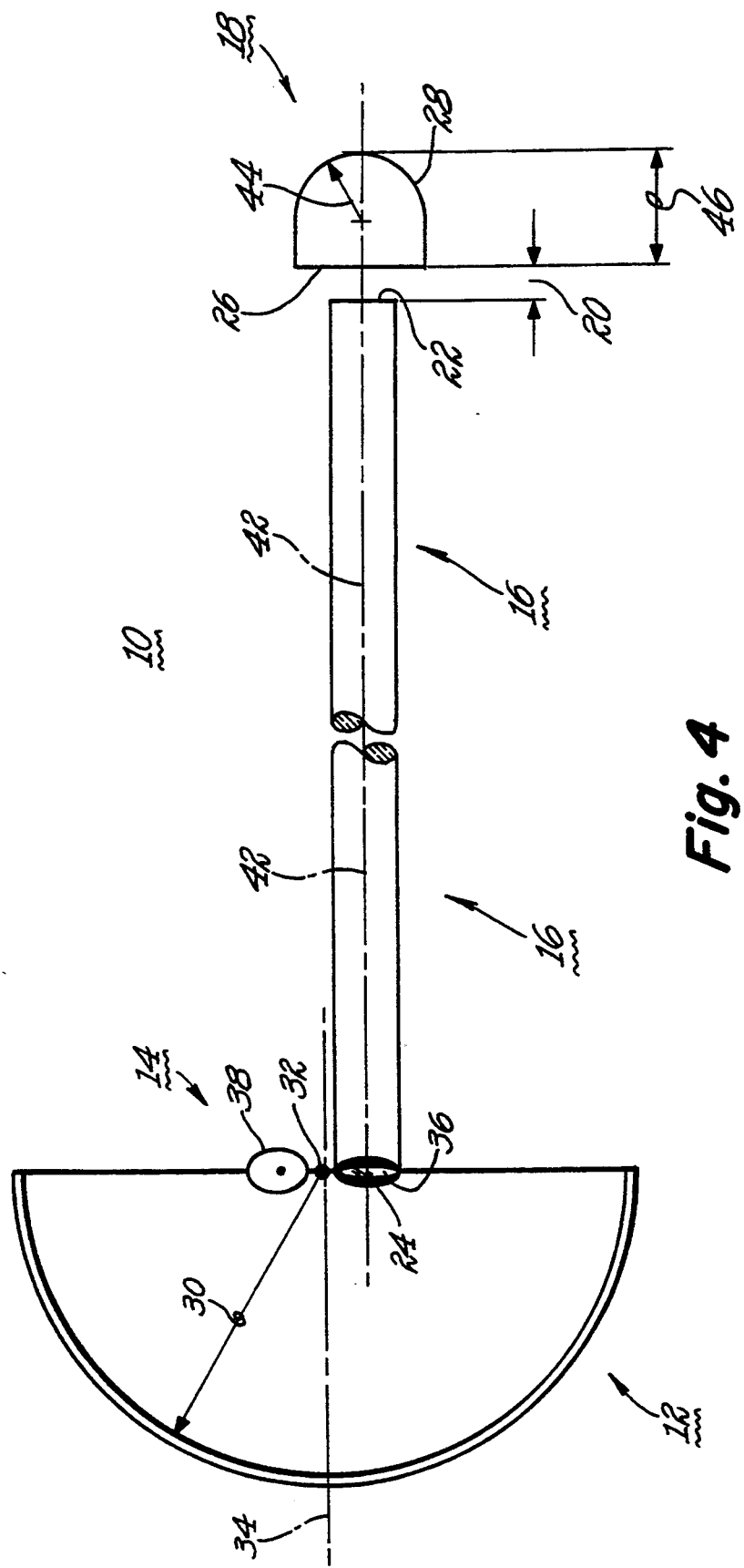
FIG. 4 is an elevational view in section of an alternate embodiment of the present invention showing a hemispherical lens with a thickness 25 percent greater than that of a perfectly hemispherical lens.

In another embodiment of the present invention shown in FIG. 4 a lens 18 was used in which the thickness 46 of the lens 18 was increased by 25 percent compared to that of FIG. 1. For this case, the ray trace program showed a beam divergence of sixty one degrees full angle compared to the seventy degrees mentioned earlier. If the lens is made too thick, some rays will begin to get reflected back into the guide and other rays will escape through the edge of the lens. If the diameter and thickness of the lens are increased or decreased keeping the same proportions, the divergence increases so an optimum exists somewhere near the values of diameter two times the optical fiber diameter, radius of curvature equal to the fiber diameter, and thickness about twenty five percent greater than the fiber diameter.

Although the previously described embodiment of the present invention constitutes a preferred embodiment, it should be understood that modifications can be made thereto without departing from the scope of the invention as set forth in the appended claims. For instance, the principles of the present invention can be used to increase the divergence of a narrow beam of light. A narrow beam could be introduced at the curved surface of the lens so that light leaving the lens through its planar surface enters the input face of an optical fiber at a wide angle. Consequently the light is transmitted to the output end of the optical fiber where the beam emerges at the same wide angle it entered the input face of the optical fiber.

We claim:

1. An illumination system for channeling light from one location to a remote location wherefrom a narrow controlled beam of light is delivered, comprising:

a light source, means for collecting light from said light source, at least one light guide disposed in proximate relation to said collecting means, said at least one light guide having an output face and input face to which light from said collecting means is introduced to said input face at an angle greater than approximately 60 degrees full angle, hemispherically shaped lens member having a planar surface disposed in proximate yet in optically non-contacting relation to the output end of said light guide, air gap disposed between said output face of said at least one light guide and said planar surface of said hemispherically shaped lens, said air gap being effective such that a light output initially diverges upon exiting said output face and prior to impinging upon said planar surface of said hemispherically shaped lens; and said hemispherically shaped lens having a hemispherical surface, said hemispherically surface of said lens further having a longitudinal axis disposed coincident with said longitudinal axis of said at least one light guide so that light passing from said output face of said light guide is first diverged through said air gap, converged a first time through said planar surface and converged a second time at said hemispherically shaped surface of said lens for output to said remote location and, wherein said light source has a predetermined arc gap distance and said at least one light guide has a diameter approximately equal to said arc gap distance.

2. An illumination system according to claim 1 wherein said light source is a xenon metal halide lamp.

3. An illumination system according to claim 1 wherein the means for collecting and introducing light from said light source to said input face of said at least one light guide is such that the diameter of such light guide is minimized by increasing the angle over which light is introduced into said input face of said light guide from approximately 60 to 180 degrees.

4. An illumination system according to claim 3 wherein said light collecting means is an ellipsoidal mirror having a predetermined center of curvature and an optical axis passing through said center of curvature and, said ellipsoidal mirror further having two foci that are close to said optical axis and are mirror images of each other about said optical axis, said light source being located at one focus so as to form a unit magnification image at the other focus where said input face of said light guide is disposed.

5. An illumination system according to claim 1 wherein said light guide is an optical fiber.

6. An illumination system according to claim 1 wherein the portion of said light source facing away from said light collecting means is coated with a reflective coating to redirect light emitted towards said light collecting means so as to increase the amount of light reaching said light collecting means from said light source.

7. An illumination system according to claim 1 wherein the hemispherically shaped lens has a radius of curvature and thickness both equal to the diameter of said light guide, the diameter of said planar surface of hemispherically shaped lens being approximately twice said diameter of said light guide.

8. An illumination system according to claim 1 wherein the diameter of said planar surface of hemispherically shaped lens is approximately twice said diameter of said light guide, said thickness of said lens being approximately 25 percent longer than said diameter of said light guide.

9. An illumination system for channeling light from one location to a remote location wherefrom a narrow controlled beam of light is delivered, comprising:

a light source, means for collecting light from said light source, at least one light guide disposed in proximate relation to said collecting means, said at least one light guide having an input face to which light from said collecting means is introduced to said input face at an angle greater than approximately 60 degrees full angle, hemispherically shaped lens member having a planar surface disposed in proximate yet in optically non-contacting relation to the output end of said light guide, air gap disposed between said output face of said at least one light guide and said planar surface of said hemispherically shaped lens, said air gap being effective such that said light output initially diverges upon exiting said output face and prior to impinging upon said planar surface of said hemispherically shaped lens; and said hemispherically shaped lens having a hemispherical surface, said hemispherically shaped surface of said lens further having a longitudinal axis disposed coincident with said longitudinal axis of said optical fiber so that light passing from said output face of said light guide is first diverged through said air gap, converged a first time through said planar surface and converged a second time at said hemispherically shaped surface of said lens for output to said remote location wherein said light guide is an optical fiber with an anti-reflection coating applied onto the input and output faces of said optical fiber to reduce loss of light by reflection through said input and output faces.

* * * * *